United States Patent
Cormier et al.

(10) Patent No.: US 12,365,611 B2
(45) Date of Patent: Jul. 22, 2025

(54) WASTEWATER TREATMENT METHOD AND SYSTEM

(71) Applicant: Troy L. Cormier, Lake Charles, LA (US)

(72) Inventors: Troy L. Cormier, Lake Charles, LA (US); Michael Catanzaro, Lake Charles, LA (US)

(73) Assignee: Troy Cormier, Lake Charles, LA (US)

( * ) Notice: Subject to any disclaimer, the term of this patent is extended or adjusted under 35 U.S.C. 154(b) by 133 days.

(21) Appl. No.: 17/944,546

(22) Filed: Sep. 14, 2022

(65) Prior Publication Data

US 2024/0083790 A1    Mar. 14, 2024

Related U.S. Application Data

(60) Provisional application No. 63/274,475, filed on Nov. 1, 2021.

(51) Int. Cl.
*C02F 3/20* (2023.01)
*C02F 3/12* (2023.01)
*C02F 101/30* (2006.01)

(52) U.S. Cl.
CPC .............. *C02F 3/20* (2013.01); *C02F 3/1247* (2013.01); *C02F 2101/30* (2013.01)

(58) Field of Classification Search
CPC ....... C02F 3/20; C02F 3/1247; C02F 2101/30
USPC ........................................................ 210/614
See application file for complete search history.

(56) References Cited

U.S. PATENT DOCUMENTS

| | | | |
|---|---|---|---|
| 2,067,161 A | | 1/1937 | Durdin, Jr. |
| 2,353,358 A | | 7/1944 | Prager |
| 3,118,835 A | | 1/1964 | Butler et al. |
| 3,706,380 A | | 12/1972 | Le Quinquis |
| 5,874,002 A | * | 2/1999 | Cormier ............... B01D 21/003 |
| | | | 210/800 |
| 6,217,761 B1 | * | 4/2001 | Catanzaro ............. C02F 3/1247 |
| | | | 210/197 |
| 6,358,411 B1 | | 3/2002 | McKinney |

FOREIGN PATENT DOCUMENTS

CN           108176085 A  *  6/2018  ............. B01D 21/01

OTHER PUBLICATIONS

Meng et al, CN 108176085 A English machine translation, pp. 1-9 (Year: 2018).*

* cited by examiner

*Primary Examiner* — Claire A Norris
(74) *Attorney, Agent, or Firm* — Jones Walker LLP

(57) ABSTRACT

Disclosed is an apparatus for treating wastewater that includes a tank having a wall, defining an inner surface, and a floor; a clarifier having an outer surface selectably fixed relative to said tank; and a diffuser; wherein the inner surface, the outer surface and the diffuser are configured to compel wastewater in the tank to define a flow along a direction up the outer surface and down the inner surface. A method of treating wastewater also is disclosed.

4 Claims, 3 Drawing Sheets

WASTEWATER TREATMENT METHOD AND SYSTEM

REFERENCE TO EARLIER APPLICATION

This Application incorporates by reference and, under 35 U.S.C. § 119(a)-(d), is a continuation-in-part of U.S. Provisional Patent Application Ser. No. 63/274,475 filed on Nov. 1, 2021.

STATEMENT REGARDING FEDERALLY SPONSORED RESEARCH OR DEVELOPMENT

This invention is not the subject of federally sponsored research or development.

RESERVATION OF COPYRIGHTS

Portions of the disclosure of this document contain material that is subject to copyright protection. The copyright owner has no objection to any reproduction of the document or disclosure as it appears in official records, but reserves all remaining rights under copyright.

BACKGROUND OF THE INVENTION

Self-contained subterraneous wastewater treatment apparatuses commonly are used in communities in which houses are not connected to centralized wastewater treatment systems. Typically, these apparatuses are constructed from concrete or fiberglass, cast as one part or formed from a number of parts. The apparatuses usually include a housing with walls that define internal aerator and clarifier chambers. The aerator chamber is the heart of the wastewater treatment plant. Wastewater received in the aerator chamber is oxygenated. Introduction of oxygen into the wastewater intimately mixes the organic components of the wastewater with the bacteria populations in the aerator chamber, creating an activated sludge. The bacteria reduce the organic components of the wastewater. To maximize the oxygen content of the wastewater, the wastewater should circulate in a manner that maintains organic components in suspension. If the organic components settle, they are not as accessible and less likely to be broken down by the bacteria.

Ideally, once the wastewater is has been treated sufficiently, when the bacteria has broken down a target amount of the organic components in solution, the activated sludge passes from the aerator chamber into a clarifier chamber. In the clarifier chamber, any solids remaining in suspension which have not been broken down settle and are returned to the aerator chamber for continued circulation and breakdown. The activated sludge is treated in the clarifier chamber then voided out of the clarifier chamber to be absorbed by the environment.

The key to consistent, efficient, and reliable wastewater treatment is assuring that the proper amount of oxygen is introduced into the wastewater for reaction with the bacteria. The speed at which reduction of the organic components in the wastewater is accomplished is directly related to the amount of oxygen that can be introduced into the wastewater. The rate of oxygen introduction is directly related to the configuration of, and the diffusion mechanisms used to introduce oxygen in the aerator chamber. Proper configuration of the aerator chamber and placement of the diffusers therein is crucial. Once an appropriate configuration is selected, oxygen content enhancement of the wastewater may be increased by increasing the flow of the wastewater within the chamber, perhaps with turbulent characteristics. The oxygen content also may be enhanced by maintaining oxygen at a high pressure in association with the wastewater, similar to carbonating a beverage.

Another way to enhance oxygen content is by configuring cooperative structures of the treatment tank that urge wastewater flowing therein to develop aeration zones or localized volumes that, while not physically segregated, interact in a way that manifests quasi surfaces therebetween. Prior inventions, such as disclosed in U.S. Pat. No. 6,093,316, employ this approach by disposing a clarifier having an inverted frusto-pyramidal outer configuration in an aeration tank having an essentially cubic inner configuration. The invention improves on this convention by eliminating dead spots in the corners with a tank that has a cylindrical or frusto-conical inner configuration.

Another way to enhance oxygen content and wastewater mixing, and increase efficiencies is by impelling flow up along the outer surfaces of a clarifier and down the inner walls of tank, rather than vice versa as is common.

The patent literature is replete with many wastewater treatment apparatuses and methods. However, none provide for aerobic treatment with a square clarifier in a circular tank and/or by rolling the wastewater up against the clarifier then down the tank wall.

What are needed and not taught or suggested in the art are a wastewater treatment method and system that enhances oxygenation, mixture and efficiencies with a square clarifier in a circular tank and/or by rolling the wastewater up against the clarifier then down the tank wall.

The invention provides improved elements and arrangements thereof, for the purposes described, which are inexpensive, dependable and effective in accomplishing intended purposes of the invention.

Other features and advantages of the invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENTS

Figure 1:
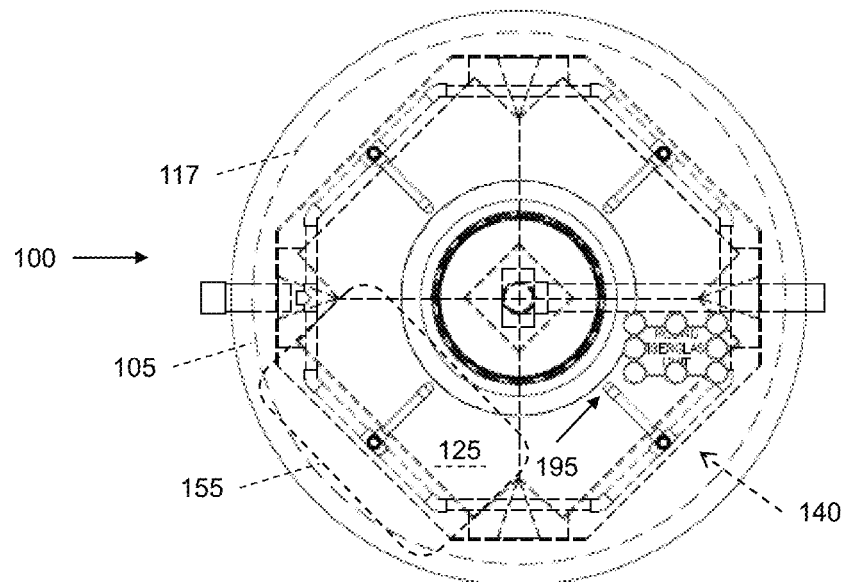
FIG. 1 is a plan view of an embodiment of a wastewater treatment system configured according to principles of the invention.

This disclosure is not limited in application to the details of construction and the arrangement of components set forth or illustrated in the drawings herein. The disclosure is capable of other embodiments and of being practiced or of being carried out in various ways. Phraseology and terminology used herein is for description and should not be regarded as limiting. Uses of "including," "comprising" or "having" and variations thereof herein are meant to encompass the items listed thereafter and equivalents thereof as well as additional items. Unless limited otherwise, "connected," "coupled" and "mounted," and variations thereof herein are used broadly and encompass direct and indirect connections, couplings, and mountings. "Connected" and "coupled" and variations thereof are not restricted to physical or mechanical or electrical connections or couplings. Furthermore, and as described in subsequent paragraphs, the specific mechanical or electrical configurations described or illustrated are intended to exemplify embodiments of the disclosure. However, alternative mechanical or electrical configurations are possible, which are considered to be within the teachings of the disclosure. Furthermore, unless otherwise indicated, "or" is to be considered inclusive.

The invention is wastewater treatment method and system that enhances oxygenation, mixture and efficiencies with a square clarifier in a circular tank and/or by rolling the wastewater up against the clarifier then down the tank wall.

Figure 2:
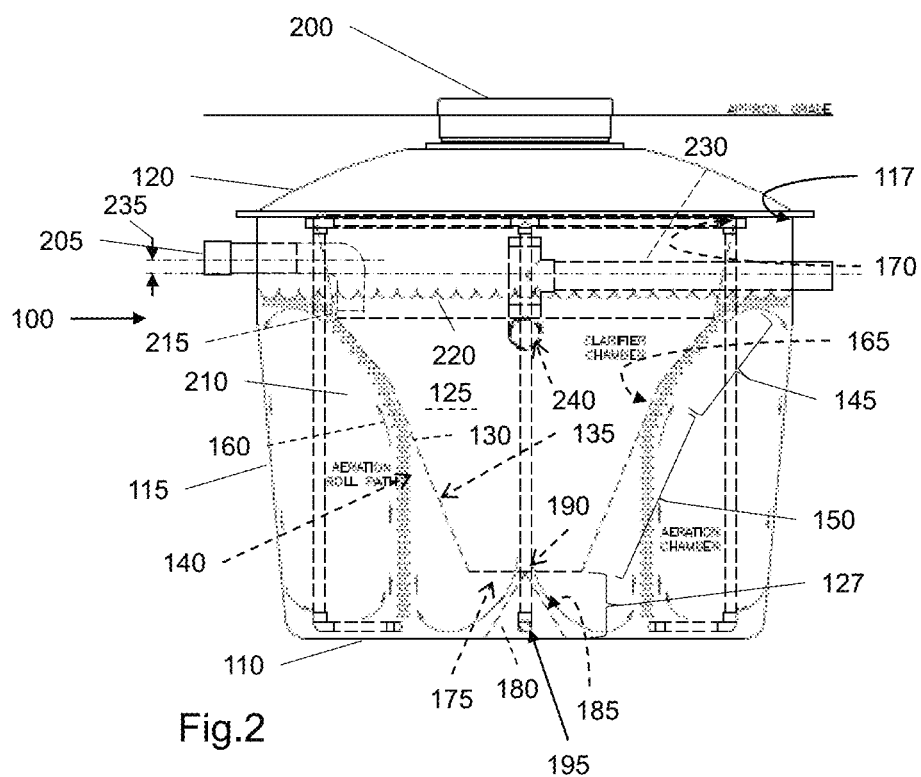
FIG. 2 is a front side elevational view of the embodiment of FIG. 1.

Referring to FIGS. 1 and 2, an embodiment of a wastewater treatment system 100 configured according to principles of the invention includes a treatment tank 105 with a floor 110 and wall 115. Wall 115 defines an interior cylinder and/or inverted conical frustum.

Wall 115 define an upper aperture 117 that closely receives a cover 120. Preferably, floor 110 and wall 115 are integrally molded from concrete having three-inch thickness. Tank 105 also is fabricated from fiberglass and other suitable materials.

A hopper or clarifier 125 is received in upper aperture 117 and depends into tank 105 at a predetermined height 127 from floor 110. Clarifier 125 has walls 130 that define interior surfaces 135 and discrete exterior surfaces 140.

As shown in FIG. 2, each exterior surface 140 cooperates with wall 115 to promote flow in a direction 160 generally vertically, rather than horizontally around tank 105, up exterior surfaces 140 and then down wall 115. As shown in FIG. 1, the plurality of discrete exterior surfaces 140 promotes localized flows within a like number of corresponding aerator zones 155.

The number of aerator zones 155 need not equal four necessarily. However, experimentation has shown that four aerator zones 155 provides optimal sewage oxygenation in tank 105. Oxygenation tends to occur more rapidly and efficiently in smaller volumes of sewage. Additionally, the use of four aeration zones 155 has been found to discourage activated sludge accumulations on floor 110 and minimize the total suspended solids discharged into the environment.

Confining flow within an aerator zone 155 essentially reduces the working volume of sewage being processed, thus enhances oxygenation of the sewage. Also, when a volume of fluid assumes a unique flow pattern relative to another, a boundary layer or quasi surface develops between the two volumes. The invention provides for establishing unique flow patterns in each aerator zone relative to the other aerator zones. Accordingly, a boundary layer or quasi surface develops between the volumes of sewage in each aerator zone. Interaction between the volumes of sewage in each aerator zone occurs along the quasi surfaces created which promotes oxygenation. The interaction, possibly turbulent, also further agitates the sewage and helps to prevent the solids from settling. This agitation feature reduces the amount of servicing that devices not utilizing the principles of the invention require to clean out settled matter.

Interior surfaces 135 define an interior chamber 165 with an upper aperture 170 and a lower aperture 175. The narrow, throat-like lower aperture 175 minimizes fluid flow within chamber 165 and encourages particulate matter to settle out onto and down interior surfaces 135 of chamber 165 and out of lower aperture 175.

A deflector cone 180 is mounted on floor 110 beneath lower aperture 175. Deflector cone 180 should be centrally located on the floor 110 to encourage uniform flow characteristics throughout tank 105. Preferably, deflector cone 180 has a like number of surfaces 185 as exterior surfaces 140 of clarifier 125. Surfaces 185 and 140 cooperate to promote vertical flow in direction 160 within each aerator zone 155. To restrict flow through aperture 175, the vertex 190 of deflector cone 180 is received into the center of lower aperture 175 by a predetermined amount.

Air release ports 195 are disposed in each aerator zone 67. Air release ports 195 each terminate in foraminous members (not shown) proximate to floor 110 and positioned inwardly of wall 115 by an amount that maximizes flow in direction 160 and/or optimizes wastewater aeration. The foraminous members receive pressurized air and create large quantities of air bubbles. The air bubbles flow upward and induce wastewater in tank 105 to flow with great force against wall 140 that induces mixing of the wastewater and air.

Once in chamber 165, the aerated wastewater circulates slowly in another direction. Particulate matter precipitates from solution and falls against the interior surface 135 of the clarifier 125. The particulate matter slides down interior surface 135, through lower aperture 175, and back into one of the aerator zones 155. Once back in an aerator zone 155, the particulate matter re-circulates in the direction 160 for further breakdown by bacterial agents in the aerator zones 155.

Referring to FIG. 2, cover 120 is configured to seat on and seal aperture 117 of tank 105. When the cover 120 is in place, the apparatus 100 is installable as a self-contained unit in the ground nearby the building the apparatus is servicing. Cover 120 prevents the apparatus from becoming clogged with dirt.

Cover 120 also maintains a pocket of gas above the wastewater at a predetermined super-ambient pressure within the tank. Cover 120 has an access 200 for periodic servicing. Cover 120 and access 200 discourage gas from escaping from the treatment tank 105.

Referring to FIG. 2, an inlet 205 extends through wall 115 and introduces wastewater into the aerator chamber 210. Inlet 205 has an terminal end 215 that is bent downwardly, terminating below the wastewater level 220 in tank 105. If terminal end 215 were not provided in such a manner, gas pressure within the pocket defined by cover 120, wall 115 and wastewater surface would equilibrate with the ambient atmosphere outside of tank 105 and allow noxious gases to vent back into the building apparatus 100 services. In other words, foul smelling gases would return from the treatment tank into the building and create inhospitable conditions.

An outlet 230 is centrally disposed in the upper portion of clarifier 125 for voiding wastewater from chamber 165. Since inlet 205 initiates wastewater treatment and outlet 230 terminates treatment, relative placement of the two conduits controls apparatus performance, specifically the vertical relationship 235 between inlet 205 and outlet 230. An advance of the invention is associating air at super-ambient pressure with the wastewater in tank 105. Maintaining a pocket of air at super-ambient pressure in association with the wastewater forces more air, hence oxygen, into the wastewater, enhancing the oxygenation of the wastewater.

Wastewater containing great amounts of oxygen can sustain larger bacteria populations that more swiftly break down organic components in the wastewater. In order to pressurize the air pocket above the wastewater surface, the inlet 205 must be maintained above the outlet 230 by a predetermined vertical relationship 235. Wastewater delivered by the inlet 205 at a superior height relative to the outlet 230 imparts pressure against wastewater in tank 105 proportional to this vertical relationship 235, consistent with Bernoulli's law. A large vertical relationship 235 results in greater pressure being exerted by the wastewater column against the wastewater in tank 105. This pressure urges the wastewater level 220 in tank 105 to rise, thereby compressing gas against the pocket maintained by the cover 120. The wastewater line 220 levels out at the height at which the outlet 230 is disposed, therefore may only compress the gas in the pocket by a predetermined amount.

The preferred vertical relationship 235 between inlet 205 and the outlet 230 is approximately two inches. This two-inch drop creates a pocket of air having a pressure between 0.20 and 0.25 pounds per square inch (psi). Significant experimentation has shown that pressures exceeding this pressure range impair the treatment capability of the apparatus. First, the wastewater in tank 105 does not flow as well as at lower pressures. Second, an air pump (not shown) that delivers air to air release ports 195 tends to labor unproductively. Third, despite increased pressures, air release ports 195 are not able to generate significantly more bubbles to increase the flow of the wastewater.

To sustain the pocket of air at the ideal pressure, air release ports 195 each receive ambient air at 2.5-3.0 psi which is introduced into aerator zones 155 at a rate of 2.5-3.0 cubic feet per minute. The air not absorbed by the wastewater, bubbles out of the wastewater and is trapped in the pocket there above.

Ordinarily, wastewater passes from chamber 165 through the lower aperture 240 of outlet 230. The wastewater is oxygenated such that, as the wastewater passes out through outlet 230, absorbed air escapes at a steady rate, maintaining the desired 0.20-0.25 psi air pocket. If air release ports 195 introduce more than the desired amount of air into aerator zone 155, or inlet 205 or outlet 230 do not convey the wastewater as intended, apparatus 100 may include a relief valve (not shown) mounted on the outlet 230. The relief valve opens and vents to the atmosphere gasses at pressures exceeding 0.20-0.25 psi through the outlet 230.

Figure 3:
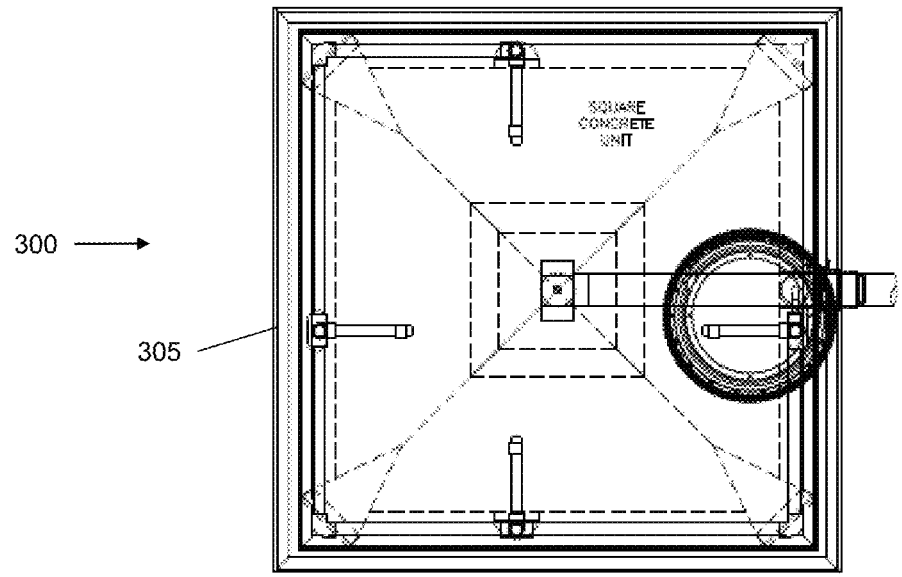
FIG. 3 is a plan view of another embodiment of a wastewater treatment system configured according to principles of the invention.
Figure 4:
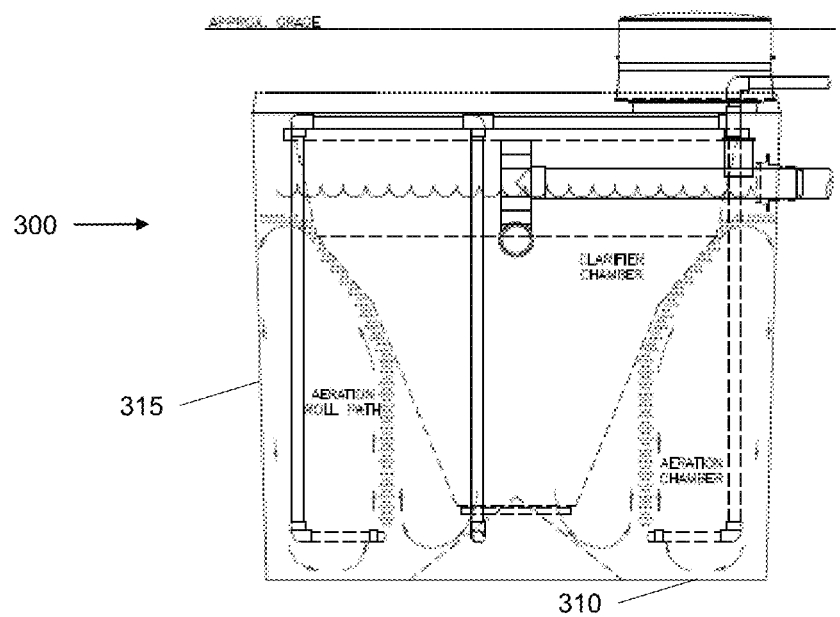
FIG. 4 is a front side elevational view of the embodiment of FIG. 3.

Referring to FIGS. 3 and 4, another embodiment of a wastewater treatment system 300 configured according to principles of the invention includes a treatment tank 305 with a floor 310 and walls 315. Apparatus 300 is similar to apparatus 100 except that walls 315 define a cube or inverted pyramidal frustum. Apparatus 300 operates substantially similarly to apparatus 100.

Figure 5:
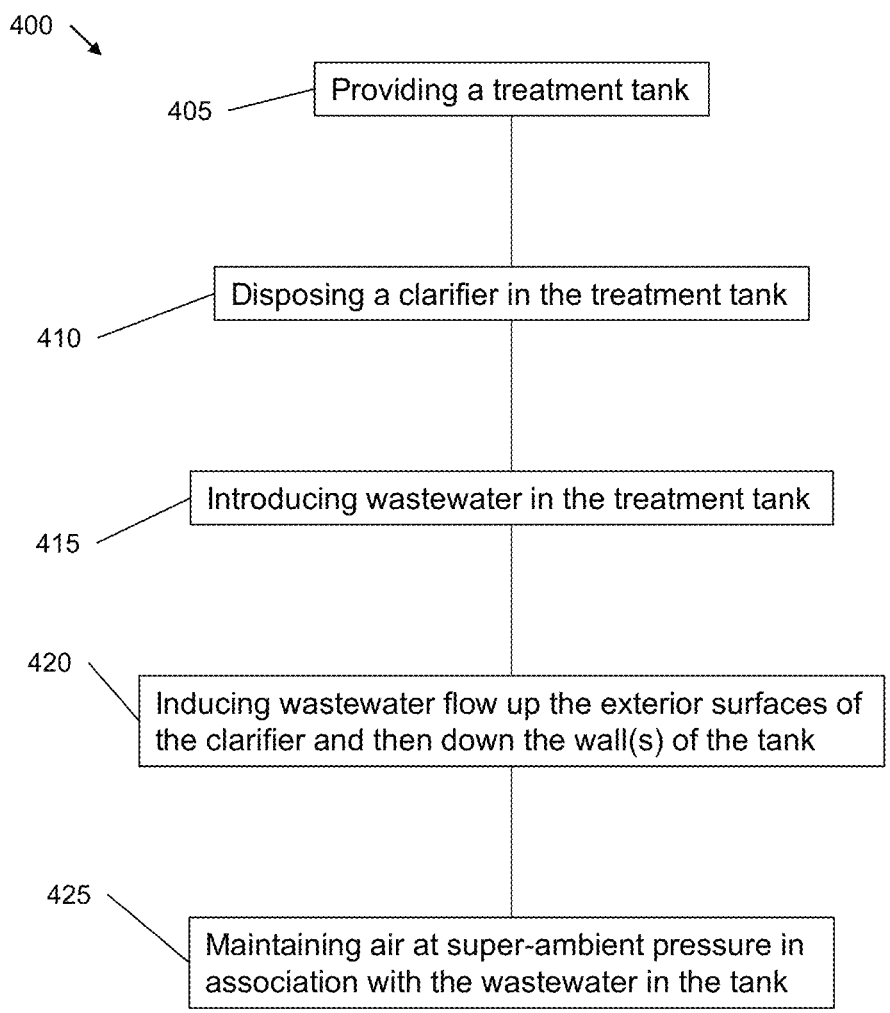
FIG. 5 is a graphical representation of a method of treating wastewater configured according to principles of the invention.

Referring to FIG. 5, an embodiment of a method for treating wastewater 400 preferably employs but is not limited to implementation with apparatus 100 or 300.

Method 400 includes a step 405 of providing a wastewater treatment tank comparable to tank 105.

Method 400 includes a step 410 of disposing a clarifier comparable to clarifier 125 in the treatment tank. The clarifier should have an interior clarifier chamber comparable to chamber 165. The distinct exterior surfaces of the clarifier cooperate with the walls and floor of the tank to define an aerator chamber, subdivided into a like number of aerator zones as clarifier exterior surfaces.

Method 400 includes a step 415 of introducing wastewater into the tank.

Method 400 includes a step 420 of inducing flow of the wastewater up the exterior surfaces of the clarifier and then down the wall(s) of the tank, as described herein with respect to apparatus 100.

Method 400 optionally includes a step 425 of maintaining air at super-ambient pressure in association with the wastewater contained in the tank, as described herein with respect to apparatus 100.

The invention is not limited to the particular embodiments described and depicted herein, rather only to the following claims.

We claim:

1. An apparatus for treating wastewater, comprising:
a tapered, cylindrical tank having an inner wall, an outer wall, a top defining a top circumference, and a bottom defining a bottom circumference; wherein the bottom circumference is smaller than the top circumference;
a tapered, square clarifier positioned within the tapered, cylindrical tank and having an octagonal top periphery, four tapered sidewalls, and a bottom;
four aeration zones formed within the tapered, cylindrical tank, wherein each aeration zone is defined by a first space formed between each tapered sidewall of the square clarifier and the adjacent inner wall of the tapered, cylindrical tank; and
four boundary zones formed within the tapered, cylindrical tank, wherein each boundary zone is defined by a second space formed between each corner joint of the square clarifier and the adjacent inner wall of the tapered, cylindrical tank, wherein each boundary zone functions to separate adjacent aeration zones.

2. The apparatus of claim 1, further comprising a diffuser configured to compel the flow of wastewater in each of the four aeration zones in a cyclical flow path from a bottom of the tapered, cylindrical tank, up the tapered sidewalls of the square clarifier, and down the inner wall of the cylinder.

3. The apparatus of claim 1, further comprising a deflector cone positioned beneath a passage formed in the bottom of the square clarifier.

4. The apparatus of claim 1, further comprising a cover mounted on the tapered, cylindrical tank; wherein the tapered, cylindrical tank and said cover are configured to maintain in association with wastewater in the tapered, cylindrical tank a gas having a super-ambient pressure.

* * * * *